US005984043A

United States Patent [19]

Ruhe et al.

[11] Patent Number: 5,984,043

[45] Date of Patent: Nov. 16, 1999

[54] MAGNETIZABLE FLAT DAMPING COMPONENT AND ADHESIVE, ESPECIALLY FOR USE IN SOUND-DEADENING MATS

[75] Inventors: Thomas Ruhe, Krumbach; Max Wagner, Loppenhausen; Stefan Lahner, Krumbach; Manfred Roller, Niederstotzingen, all of Germany

[73] Assignee: M. Faist GmbH & Co. KG, Krumbach, Germany

[21] Appl. No.: 08/930,159

[22] PCT Filed: Mar. 26, 1996

[86] PCT No.: PCT/EP96/01326

§ 371 Date: Jan. 7, 1998

§ 102(e) Date: Jan. 7, 1998

[87] PCT Pub. No.: WO96/32709

PCT Pub. Date: Oct. 17, 1996

[30] Foreign Application Priority Data

Apr. 11, 1995 [DE] Germany ....................... 295 06 265 U

[51] Int. Cl.[6] ....................... F16F 15/00

[52] U.S. Cl. ....................... 181/208; 181/290

[58] Field of Search ....................... 181/207, 208, 181/284, 290, 294, 286; 428/215, 219

[56] References Cited

U.S. PATENT DOCUMENTS

| | | | |
|---|---|---|---|
| 3,424,270 | 1/1969 | Hartman et al. | 181/290 |
| 5,300,355 | 4/1994 | Mifune et al. | 428/215 |
| 5,695,867 | 12/1997 | Saitoh et al. | 428/219 |

*Primary Examiner*—Khanh Dang

*Attorney, Agent, or Firm*—Hopgood, Calimafde Kalil & Judlowe

[57] ABSTRACT

In a magnetizable flat damping component with an acoustic wave damping or suppressing layer (5) with an adhesive layer (2) bonded thereto for securing the damping component to other objects (6) and with magnetizable particles (3) in the damping component the magnetizable particles are integrated into the adhesive layer (2) using binding agents (4).

19 Claims, 1 Drawing Sheet

Figure 1:
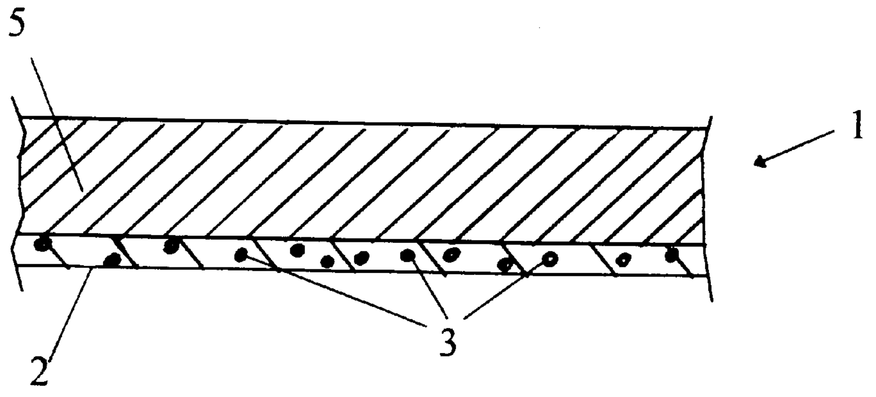

MAGNETIZABLE FLAT DAMPING COMPONENT AND ADHESIVE, ESPECIALLY FOR USE IN SOUND-DEADENING MATS

The invention relates to a magnetisable flat insulating member with an insulating layer deadening or insulating acoustic waves from articles, and to an adhesive.

Such magnetisable insulating members are already known (DE-37 11 810 A1, DE-AS 12 09 319, U.S. Pat. No. 4,010,818). They are used particularly as "sound-deadening films" in automobile technology for preventing drumming of the sheet metal parts, particularly body parts, covered therewith, and are also used for deadening body noise. Barium ferrite is disposed as magnetisable particles with bitumen in the insulating or deadening insulating layer, which has to fulfil the purpose of "sound-deadening". In order that such sound-deadening films can be easily and as far as possible permanently attached in the body parts, the underside of the insulating layer having the magnetisable particles is provided with an adhesive layer, which has a hot melt, i.e. a compound becoming adhesive upon the application of heat, or a pressure-sensitive adhesive, i.e. a self-adhesive. Magnetic strip compound layers with non-magnetic films are also known. The proportion of magnetisable particles, i.e. barium ferrite, on the flat insulating member comes to more than 50% by weight, so that the acoustic properties as regards sound insulating or sound deadening by the bitumen layer are impaired. Until now however this disadvantage has been accepted, as the magnetic efficiency improves the attachment to tightly curved or corrugated under surfaces, for example in the floor area of automobile doors, in comparison to such sound-deadening films or sound-deadening matting, which have a self-adhesive layer on the insulating or deadening layer, without using magnetic particles. Even the latest developments in bituminous magnetic films, which are provided with a pressure sensitive adhesive layer, do not improve the previously known systems to a sufficient degree.

The object underlying the invention is to improve a magnetisable flat insulating member of the type already mentioned in that, being simple and cost-effective to manufacture, it may likewise be simply and easily permanently attached to the relevant article, and in addition the insulating or deadening properties are substantially unimpaired.

The invention relating to the magnetisable flat insulating member characterized in having an external adhesive layer, for which an aqueous dispersion is used as the binding layer, and in which magnetizable particles are embedded. According to this, the magnetisable particles are not integrated in the insulating layer, but in the adhesive layer, using binding agents. By virtue of the fact that the layer essential for the insulating and deadening purposes is no longer "charged" with magnetisable particles, the acoustic properties can be better controlled, which above all becomes apparent in a wider frequency spectrum of the waves to be insulated or deadened. In addition, it has also however become apparent that by means of introducing the magnetisable particles only into the adhesive layer, a further important advantage is obtained. The magnetic efficiency is substantially improved, although less and even more cost-effective magnetisable material can be used. In comparison with the thickness, there is an advantage in quantity as regard the entire quantity of ferrite. Thus, due to the comparatively thin adhesive layer, practically all the magnetic material can become effective as regards its magnetic adhesive effect, as the adhesive layer is in the closest vicinity to the article such as body metal, upon which the flat insulating member is attached. Correspondingly, the proportion of magnetisable particles in the entire insulating member is less. Despite their introduction only into the adhesive layer, at that point there are used preferably between 20 and 80% by weight, particularly between 30 and 65% by weight of magnetisable particles. The proportion of the same in the overall insulating member is thus substantially less.

In addition to this, in comparison to the prior art already mentioned, in which hot melt is used as an adhesive layer, there arises the substantial advantage that the application of higher temperatures in order to render the layer adhesive is not necessary, but that operation can be within a wide temperature range. When fitting the insulating members, the adhesive and magnetic forces mutually reinforce one another.

In order to use small quantities of magnetisable particles, barium and/or strontium ferrite are preferred. However, iron oxide powders, such as $\gamma Fe_2O_3$ and/or $Feo.Fe_2O_3$ may be used. The average particle size is appropriately in a narrow range between 0.1 and 0.4 mm without excessive scattering.

It is recommended that the thickness of the adhesive layer should be small. Preferably, a layer thickness between 0.5 and 1.5 mm is used.

For the actual insulating or deadening layer, the conventional layer thickness clearance not provided with magnetic particles can be retained. As no magnetisable particles are embedded at this point it is also not possible to compensate the impairment of the insulating/deadening effect by the magnetisable particles by enlarging the layer thickness. To this extent also the overall thickness of the magnetisable flat insulating member is relatively small, so that it also becomes possible to fit it in only narrow interspaces without substantial compression of the insulating member.

In addition, a further portion of the invention is now described, according to which magnetic particles are dispersed in a binding agent, particularly for use in sound-deadening matting, said binding agent in particular being itself active as an adhesive and/or containing adhesive agents. During processing, this adhesive is a fluid compound in the form of a dispersion, which dries at a certain degree of heating between 20 and 180° C. under the effect of ambient air, but then still has sufficient adhesive or gluing effect. In the dry condition, this pressure-sensitive adhesive has, in combination with a rigid carrier (e.g. a bitumen-impregnated cardboard, metal foil consisting in particular of aluminium and/or coated paper or the like) an extremely high body sound insulating effect, which is to be ascribed to the visco-elastic behaviour of the adhesive. In other words, here an extremely good broad-band capacity of the so-called loss factor can be achieved, which is not possible for example with previous magnetic films due to the high proportion of ferrite.

The adhesive according to the invention enables gluing of articles in which both the adhesive and the magnetic adhesive effect are used in common. In this way it is possible to make articles magnetisable, when the adhesive is applied to the article. Should the adhesive effect be undesirable, the proportion or the type of binding agent may be so selected that after application of the adhesive compound, such a degree of hardening is effected that the "magnetic body" adheres well to the article, but on the other, free, side of this magnetisable covering of the article there remains a surface which is no longer adhesive. A preferred example of the use of the adhesive according to the invention is the coating of foam material, e.g. polyurethane foam, which may be magnetically applied as a mat or layer, e.g. on the roof lining in the automobile. Separation is very simply possible, for better recycling.

The adhesive according to the invention may in particular be cast, rolled and/or applied by squeegee. It is more appropriately built up on an aqueous dispersion basis which is free of solvents.

The following is an example of the self-adhesive design of the adhesive according to the invention:

| | |
|---|---|
| Acrylate | 10.0–65% by wt. |
| Resin "tackifier" | 5.0–30.0% by wt. |
| Thickening agent | 0.0–0.2% by wt. |
| De-foamer | 0.0–0.2% by wt. |
| Distilled water | 0.0–0.9% by wt. |
| Iron oxide and/or Strontium and/or Barium ferrite | 20.0–80.0% by wt. |
| Biostabiliser | <0.01% by wt. |
| Wetting agent | 0.0–0.9% by wt. |
| Auxiliary agent | 0.0–0.9% by wt. |

It is recommended, before producing the mixture, to coat the ferrite, e.g. with lithium stearate, so that drying is facilitated. There is for example used pure acrylate, which also may be replaced by acrylic acid ester copolymerisates containing carboxyl groups or the like, and material still pressure-sensitive or adhesive after drying. Additions of natural resins such as pine resins improve the adhesive effect. Thickening agents on a polyurethane base lead to the viscosity desired for processing. Products on the basis of paraffinic petroleum products are used as de-foamers. In order to achieve stabilisation against microorganisms, commercially available biostabilisers are used. Sodium gluconate for example is used as an auxiliary agent. In order to bind a portion of the water, commercially available wetting agents such as isocyanate are used.

The following is an example of the design of the adhesive which is no longer self-adhesive after application and drying:

| | |
|---|---|
| Vinyl acetate copolymerisate | 10.0–50.0% by wt. |
| Distilled water | 10.0–30.0% by wt. |
| Barium and/or Strontium ferrite and/or Iron oxide | 20.0–80.0% by wt. |
| Biostabiliser | <0.01% by wt. |
| Auxiliary agent | 0.0–0.9% by wt. |

In this case a dispersion which is free of blocking after drying, such as acrylate, vinyl acetate copolymerisate, propionate or the like is used. Here also the compound can contain thickening agents, de-foamers and biostabilisers in addition to the magnetisable particles, which are contained in the adhesive compound and remain dispersed after drying, without relevant de-mixing problems arising.

It is self-evident that the adhesive compound should remain liquid or in paste form at ambient temperature before application to the relevant articles.

Figure 2:
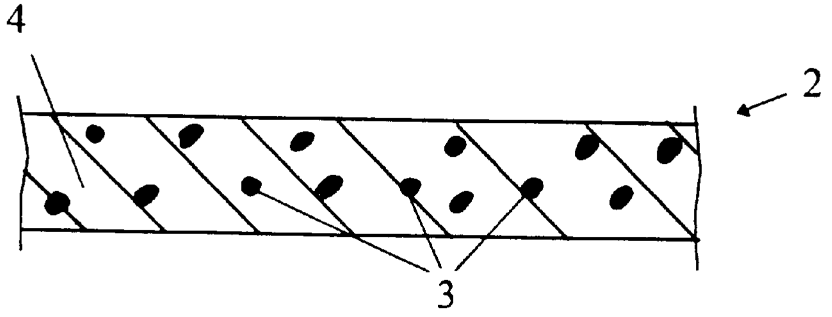
Figure 3:
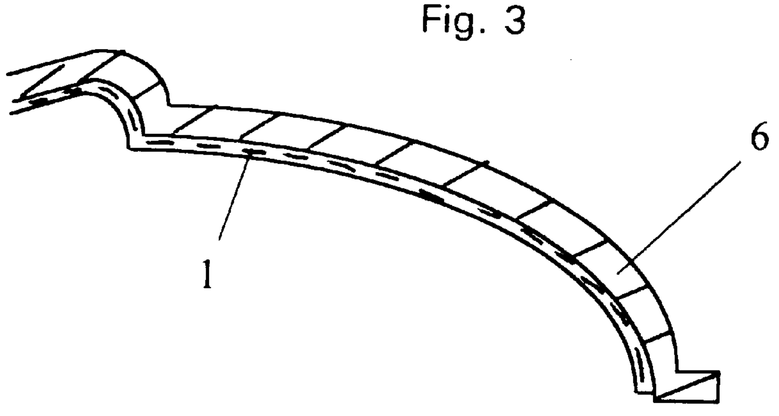

An embodiment of the invention given by way of example is explained with reference to the drawings, which show:

FIG. 1. a schematic partial section through the magnetisable and flat insulating member according to the invention;

FIG. 2. a detail from a portion of the adhesive layer or a layer of adhesive compound, and FIG. 3. a schematic cross-section through the use of an insulating member according to the invention on an automobile body part.

According to FIG. 1 the insulating member 1 has an insulating layer 5, insulating or deadening the acoustic waves, comprising e.g. the following material:

| |
|---|
| coated paper |
| metal foil |
| PVAC foil |
| EVA foil |
| bitumen-impregnated cardboard |
| bitumen foil |

On the underside of this insulating layer 5 there is an adhesive layer 2, which is provided with magnetisable particles 3.

According to FIG. 2, the magnetisable particles 3 of barium ferrite and/or strontium ferrite and/or iron oxide powder are finely dispersed in the adhesive layer 2 in the binding agent 4, which simultaneously retains self-adhesive properties after drying.

According to FIG. 3, the insulating member of FIG. 1 is turned with its adhesive layer 2 to face the steel body part 6, and applied adhesively thereto.

We claim:

1. A magnetizable flat insulating member with an insulating layer deadening or insulating acoustic waves from articles (6), with an adhesive layer (2) connected thereto, and with magnetizable particles, wherein the adhesive layer is disposed as an external layer and has adhesive properties serving for gluing to the articles (6), for which an aqueous dispersion is used as a binding agent, in which the magnetizable particles (3) are embedded.

2. The insulating member according to claim 1, wherein the magnetizable particles (3) are dispersed in a dispersion agent serving as a binding agent.

3. The insulating member according to claim 2, wherein an aqueous dispersion agent is used which has self-adhesive properties after drying.

4. The insulating member according to claim 2, wherein acrylate is used as a dispersion agent.

5. The insulating member according to claim 1, wherein barium ferrite is used as the magnetizable particles (3).

6. The insulating member according to claim 1, wherein strontium ferrite is used as the magnetizable particles (3).

7. The insulating member according to claim 1, wherein iron oxide powder is used as the magnetizable particles (3).

8. The insulating member according to claim 7, wherein a mixture of ferrite and iron powder is used as the magnetizable particles (3).

9. The insulating member according to claim 1, wherein the proportion of magnetic particles (3) in the adhesive layer (2) is between 20 and 80% by weight.

10. The insulating member according to claim 1, wherein the average particle size of the the magnetizable particles (3) is between 0.01 and 0.4 mm.

11. The insulating member according to claim 1, wherein the dispersion agent contains acrylate and/or acrylic acid ester copolymers containing carboxyl groups as a dispersion agent.

12. The insulating member according to claim 1, wherein the dispersion agent contains natural resins such as pine resins, as an adhesive.

13. The insulating member according to claim 1, wherein the dispersion agent contains synthetic resins such as cumaron-india resins or polyterpene resins as an adhesive.

14. An adhesive agent for use in sound-deadening matting, wherein magnetizable particles (3) are dispersed in a binding agent (2) which binding agent is produced from an aqueous dispersion and is itself active as an adhesive and/or contains additional adhesive.

15. The adhesive according to claim 14, wherein the adhesive has a consistency effective for its application by casting, rolling, or by squeegee.

16. The adhesive according to claim 14, wherein the magnetizable particles (3) are coated with lithium stearate.

17. The insulating member according to claim 3, wherein acrylate is used as a dispersion agent.

18. The insulating member according to claim 1, wherein the magnetizable particles are selected from the group consisting of barium ferrite, strontium ferrite, iron oxide, and mixtures thereof.

19. The adhesive according to claim 1, wherein the magnetizable particles are selected from the group consisting of barium ferrite, strontium ferrite, iron oxide, and mixtures thereof.

* * * * *